April 2, 1957  R. H. LLOYD  2,787,390
CLAM SHELL LOADER
Filed July 2, 1954  2 Sheets-Sheet 2
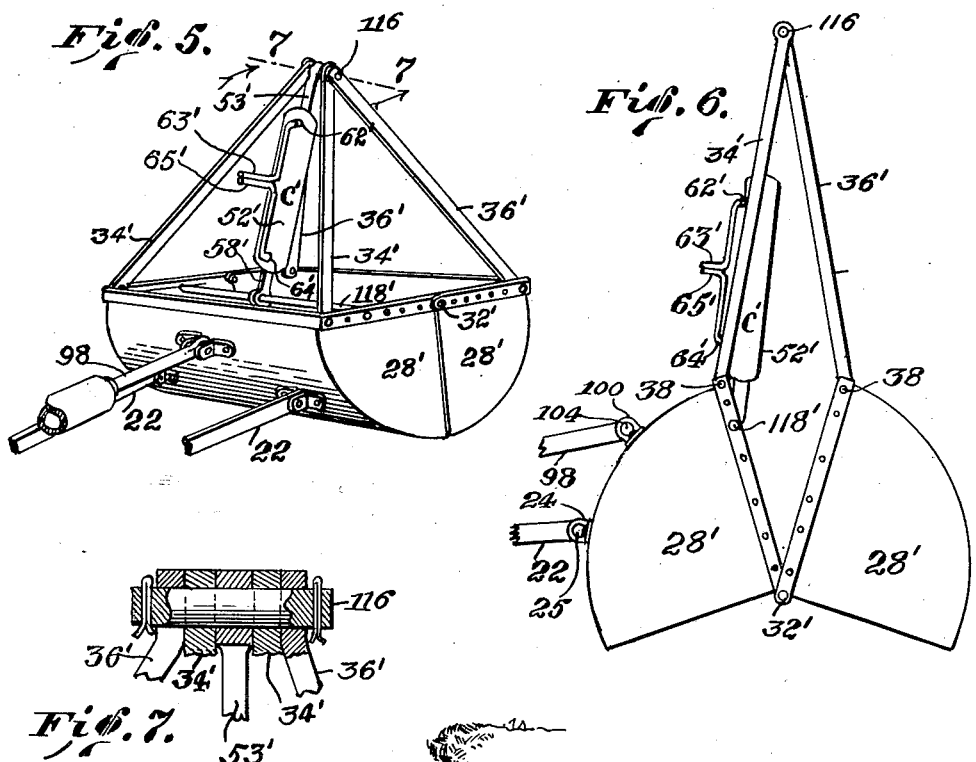
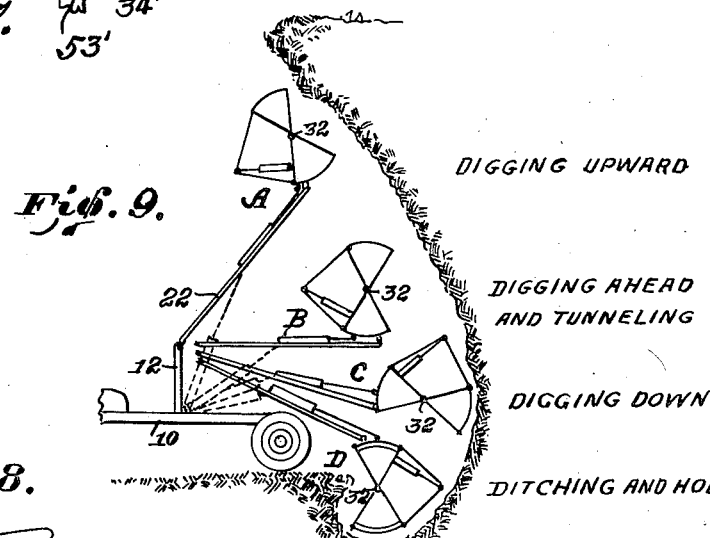
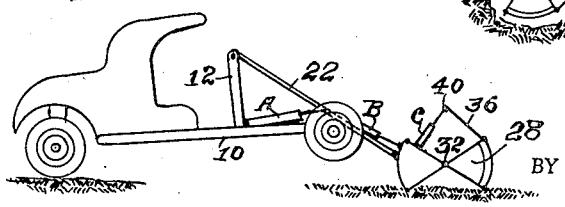
INVENTOR
ROALAND H. LLOYD.
BY David C. Wilson
ATTORNEY United States Patent Office 2,787,390
Patented Apr. 2, 1957

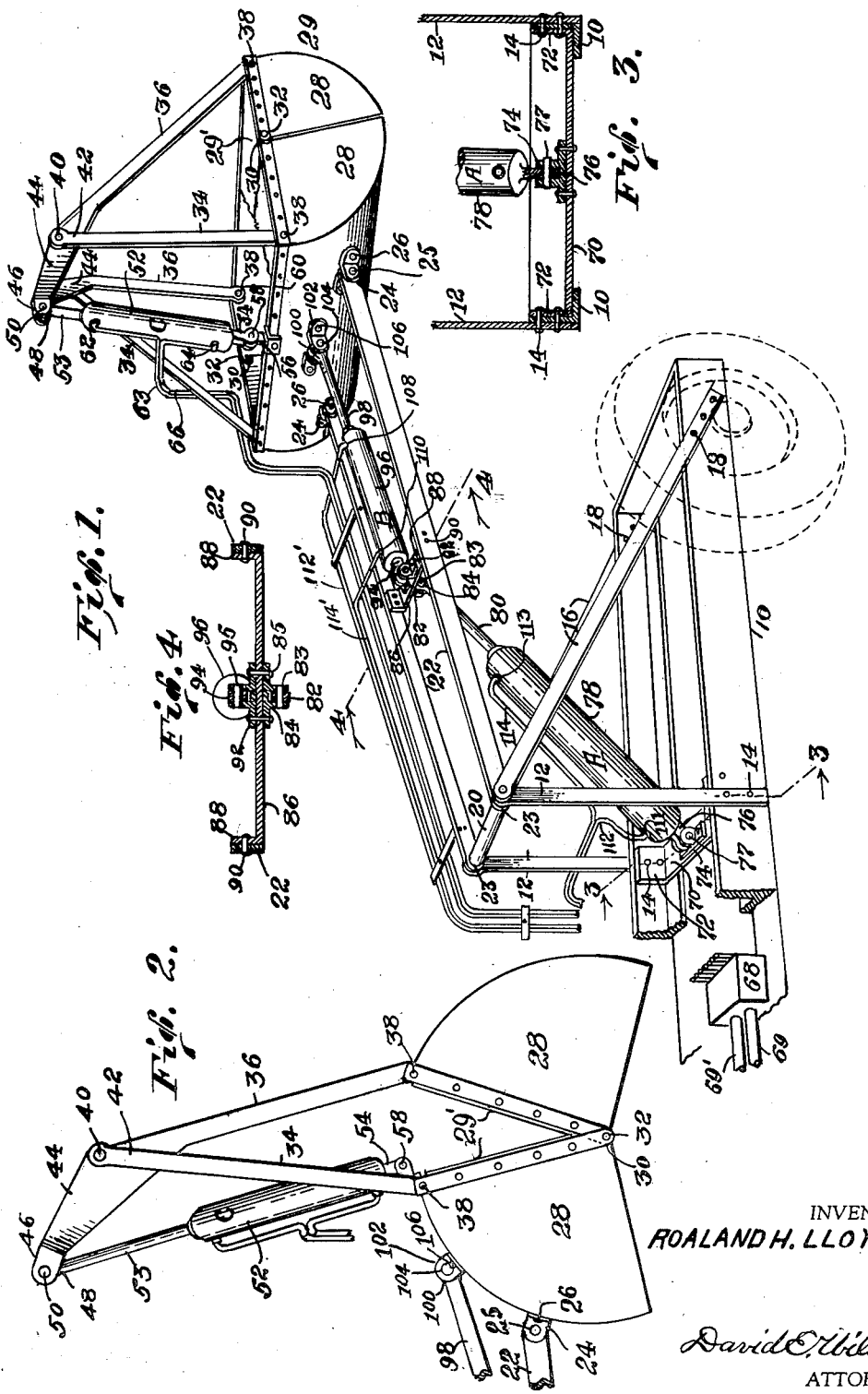

2,787,390

CLAM SHELL LOADER

Roaland H. Lloyd, East Peoria, Ill.

Application July 2, 1954, Serial No. 441,139

2 Claims. (Cl. 214—147)

My invention relates to improvements in clam shell buckets, and operating means therefore, consisting of a pair of scooped segments, hinged in a manner to open and close by hydraulic power, and designed to work on a tractor, crawler, truck or any end loader using boom arms as a means for raising and lowering clam shell buckets.

A further object of my invention is to provide an inexpensive practical clam shell bucket, which is not dependent for its operation on cables, drums, winches, motors, generators or springs, which can perform the task of digging, scraping, back-hoeing and loading or pushing in the manner of a bull-dozer.

A further object of my invention is to provide a clam shell bucket which can be operated by boom arms attached to a tractor, crawler, truck or any end loader machine, said boom arms being powered and operated by a hydraulic cylinder having its base pivoted to the frame of a tractor or other vehicle and arranged to cause the boom arms with said clam shell bucket pivotally attached, and having means to scribe an arc from the position of digging or scraping to a position of loading or dumping in combination with the tractor performing a backward and forward movement.

A further object of my invention is to provide a clam shell bucket which will operate in co-operation with a hydraulic cylinder carried on the boom arms and arranged to open and close through the action of a hydraulic cylinder maintained on said clam shell bucket.

A further object of my invention is to provide a clam shell bucket which will work as a digger, that will tip back for undermining, that will push as a bull-dozer, that will hoe back in the manner of a hoe-back shovel, and will ditch and tunnel without change or adjustment of the device.

A still further object of the invention is to provide a clam shell bucket which will open and close from a backward position of said clam shell bucket in relation to its operating base on a tractor frame and swing upward in a vertical arc of approximately 180 degrees to a position facing approximately upward.

Finally, a further object of my invention is to provide a clam shell bucket, that may be operated through the action of a hydraulic cylinder, in a manner to utilize the weight of the rear end of a tractor, whereby to obtain additional power to force the open segments of said clam shell bucket to dig into hard ground.

With these and other objects in view, the invention will now be described with reference to the accompanying drawings and will be pointed out in the appended claims.

Fig. 1 is a perspective view of the clam shell bucket and boom arms attached to the rear end of a tractor frame.

Fig. 2 is an end view of a clam shell bucket shown in Fig. 1, but depicting the clam shell segments in open position.

Fig. 3 is a sectional detailed view taken substantially on the line 3—3 of Fig. 1, to show the connection of one of the fluid pressure cylinders to a supporting crossplate, located in the tractor frame.

Fig. 4 is a sectional detailed view taken substantially on the line 4—4 on Fig. 1 showing the connection between the piston rod end of a fluid pressure cylinder with a supporting transverse cross plate and the connection of the base of a second fluid pressure cylinder.

Fig. 5 is a perspective view showing a modified form of the clam shell bucket employing substantially the same basic principal of operation as shown in Fig. 1, with certain mechanical changes with respect to the position of the base of the fluid pressure cylinder within the clam shell bucket.

Fig. 6 is an end view of the modified form of the clam shell bucket as shown in Fig. 5 depicting the clam shell segments in open position.

Fig. 7 is a sectional view in detail, taken substantially on the line 7—7 of Fig. 5, showing the manner of connecting the supporting corner bars and the piston rod head to a head pin.

Fig. 8 somewhat diagrammatically illustrates an operation of the device, the clam shell segments in this figure being in contact with the ground, in the digging position, and power from a fluid pressure cylinder being applied to the boom arms sufficient to lift the end of the tractor from the ground and thereby add a portion of the tractor weight to the digging action of the clam shell segments.

Fig. 9 somewhat diagrammatically illustrates the different positions of the operation of the device in forming the many different digging operations.

Referring to the drawings, the reference numeral 10 denotes the rear end of a tractor frame, the reference 12—12 denotes a pair of vertical stanchion posts, the lower end of said posts being riveted at 14 to the tractor frame 10, and the upper ends of said stanchion posts being engaged by the outer ends of a brace rod 20. Diagonally disposed brace bars 16—16 have their upper ends secured to the ends of said brace rod 20, and their lower ends riveted at 18, to said tractor frame 10. A pair of boom arms 22 pivotally connected to the ends of said brace rod 20, at 23, and arranged to swing in an upward and downward radial arc from the pivot point on the ends of said brace rod 20. Said tractor bars 22 are pivotally connected by pivot pins 25—25 at their outer ends to a pair of clevis members 24, which are riveted at 26 to the outer side of a segment 28 of the clam shell bucket 29. The clam shell bucket 29 is preferably of semi-hemispherical shape, the two half segments of which, 28—28, are hinged together at 30, by hinge pins, 32—32. A cover plate 29' may be used when necessary to cover the top of said clam shell segments to prevent dirt from falling out when digging upward. Two pairs of corner bars 34—34, and 36—36, are pivotedly connected at their lower ends by corner pins 38, to the four corners of the clam shell bucket, the upper end portions 42 of said corner bars being pivotally connected to a head pin 40, which serves as a fulcrum pivot point in the operating action of the said corner bars 34—34, and 36—36. Said corner bars 36—36 at their upper ends are provided with rearwardly extending arms 44—44, said arms having at their outer ends bent angular portions 46—46 comprising bell cranks, shaped to engage the head 48 of a piston rod 53, said piston rod head 48 and said bent angular portions 46 of the extending arms 44 being held in pivotal engagement by a pivot pin 50.

A fluid pressure cylinder 52, subsequently referred to as power means C, comprises at its base an integral shank member 54, designed to engage a clevis member 56 which is pivotedly connected thereto by a pivot pin 58, said clevis member 56 being secured to the rim 60 of one of the clam shell segments 28. Said power means C is positioned on the clam shell bucket in a manner that, when fluid pressure is applied to the cylinder 52, the piston and piston rod 53 of said cylinder will move axially outward and upward relative to the cylinder 52, and by reason of its pivoted connection with the extending arms 44—44 of the corner bars 36—36, and the pivoted connections of said corner bars with the head pin 40, power means from cylinder 52 will be provided whereby said corner bars will extend upward and inward as shown in Fig. 2 of the drawings. The upward and inward movement of said corner bars will cause the segments of the clam shell bucket to which said corner bars are attached to open as shown in said Figure 2. Fluid pressure hose connections are shown at 62 and 64 on said power means C to connect fluid hose 63 and 65 to remote central control box 68 located in the tractor frame. The open movement of the segments of the clam shell bucket hingedly connected together by hinge pins 32—32, is accomplished by the outward movement of the connecting rod 53 on power cylinder C. Said segments of the clam shell bucket are attached to the head pin 40 by two pairs of corner bars 34—34, and 36—36, which are pivoted at their lower ends to the outer corners of the clam shell segments 28—28, by corner pins 38. The upper end portions of corner bars 36—36, are pivotedly mounted on said head pin 40, and extend outward as shown at 44 to connect with the piston head 48 of power means C.

On the tractor frame 10, I provide a plate member 70, transversely positioned with respect to the tractor frame 10, having upturned ends 72, which are riveted at 14 with the lower ends of said stanchion posts 12, to said tractor frame 10. The clevis member 74, mounted on said transverse plate 70, positioned to receive a fluid pressure cylinder 78. Said fluid pressure cylinder 78, subsequently referred to as power means A, comprises the fluid pressure cylinder 78, having a shank member 76, secured by a pivot pin 77 to said clevis member 74, a connecting rod 80, and a connecting rod head 82, which is pivotedly connected to a clevis member 84, by a pivot pin 83. Said fluid pressure cylinder 78, is provided at its opposite ends with fluid connections 111 and 113, which provide means for connecting to fluid hose 112 and 114 respectively, said fluid hose 112 and 114 being connected to a central remote control box 68, located on the tractor frame. A plate member 86 is positioned between the boom arms 22, and is provided with upturned ends 88, which are riveted at 90 to said tractor arms 22. Said clevis member 84 is located on the under side of the transversely disposed plate member 86 and secured thereto by rivets 85. On the upper side of said plate member 86, I provide a second clevis member 92, which is located in vertical alignment with the lower clevis member 84, and secured to the said plate member 86 which, as previously stated, secures the lower clevis member 84 to said plate member 86.

A fluid pressure cylinder 96 subsequently referred to as power means B, comprises said fluid pressure cylinder, a shank member 94 integral with the base of said fluid pressure cylinder, being pivotedly connected to clevis member 92, by a pivot pin 95. A piston rod 98, of said fluid pressure cylinder 96, is provided with a piston-head 100, which is pivotally attached to a clevis member 102. Said clevis member is riveted at 106, to the side of one of the clam shell bucket segments 28.

On pressure cylinder 96, I provide fluid pressure connections 108 and 110 respectively which connect to fluid hose members 112' and 114' respectively, said fluid pressure hose members in turn are connected to the centrally remote control box 68 on the tractor frame 10. Said control box being connected to a pressure pump, not shown, through fluid pressure hose 69 and return fluid pressure hose 69'. Said clevis member 102 is riveted to said clam shell segment 28 at a pre-arranged distance above the riveted clevis members 24—24 on said clam shell segment and the pivoted ends of the tractor arms 22—22 pivoted at 25—25 to said clevis members 24—24, whereby means is provided so that, when pressure is applied to the connecting rod 98, a forward or backward movement of said connecting rod will cause the clam shell bucket to rotate on the pivoted ends of said boom arms 22—22 through pivot pins 25—25 secured to said clevis members 24—24, causing the clam shell bucket to operate in the several positions in relation to the boom arms, as shown in Fig. 9 of the drawings.

In Figs. 5, 6, and 7, of the drawings, I have shown a slightly modified form of the construction and arrangement of the corner bars 34'—34', attached to the clam shell bucket; said corner bars being assembled on a head pin 116, the shank member 58' of the fluid pressure cylinder 52' being pivotedly mounted on a cross rod 118' transversely disposed in the upper part of one of the clam shell segments 28'. When the piston rod 53' of the fluid pressure cylinder 52' is forced upward from the position shown in Fig. 5, against the head pin 116, it will cause the corner bars 34'—34' and 36'—36' to extend upward and converge together to a degree sufficient to cause the clam shell segments 28' to open outward on their hinge pins 32'—32' as shown in Fig. 6 of the drawings. As the clam shell bucket segments are constantly held under fluid pressure from the fluid pressure cylinder, it will be obvious that said segments may be held in any position desired by the operator, from a closed position for conveying material to a wide open position for dumping said material, or for use in digging or hoeing ground wherever such tasks are required.

The fluid pressure cylinders are provided with fluid pressure connections at each end, being connected to fluid pressure hose leading to a remote central control box 68, and may be used with any suitable fluid pressure medium, thus providing means whereby the operator may operate in combination or singly, each of said heretofore mentioned power means.

Fig. 9 of the drawings somewhat diagrammatically illustrates the different positions of operation of the clam shell bucket, in performing the various digging operations, and the varying positions of the clam shell segments, and the boom arms in performing the different operations. I have designated the different digging operations as follows, A, B, C, and D. Position A shows the clam shell segments wide open and facing away from the tractor frame in an elevated position, digging upward with the boom arms approximately 180 degrees elevated in relation to the tractor frame. Position B shows the clam shell segments wide open, facing away from the tractor frame, the boom arms in a horizontal position in relation to the tractor frame, the position required for digging ahead and tunneling. Position C shows the clam shell segments facing downward with the boom arms in an inclined downward position, the position required to perform the operation of digging downward. In position D, the claim shell segments are shown in reverse position from position B, their open segments facing the tractor frame, and the boom arms in the extreme downward position, in this position the clam shell segments will perform the operation of ditching and hoe-backing. From the foregoing it will be apparent that the clam shell bucket pivotedly mounted on the tractor arms and in combination with power means "A," "B," and "C," can be made to perform most any kind of digging operations.

The operation of the clam shell bucket in combination with the lifting and lowering of boom arms by means of fluid pressure cylinders is evident and will be described briefly as follows:

The tractor frame as represented in Fig. 1 of the drawings is provided with stanchions 12, to which pivoted boom arms 22 are attached. A fluid pressure cylinder 78 provides the power means to move said boom arms in an upward and downward direction, said pressure cylinder being pivotedly connected to a transverse plate 70 positioned between the tractor frames 10. When fluid pressure is applied to said fluid pressure cylinder 78 the piston rod 80 will be caused to move outward or inward depending on which end of the fluid pressure cylinder the pressure fluid is applied, thereby causing the boom arms 22 to raise or lower as desired by the operator. A fluid pressure cylinder 52 is pivotedly mounted on the rim of one of the clam shell segments, whereby when fluid pressure is applied to said pressure cylinder 52 the piston and piston rod of said cylinder will move axially outward and upward relative to said cylinder, and by reason of its pivoted connection with the extending arms 44—44 of the corner bars 36—36 and the pivoted connection of said corner bars with a head pin 40, power will be applied whereby said corner bars will extend upward and inward as shown in Fig. 2 of the drawings. The upward and inward movement of said corner bars will cause the clam shell bucket segments to open as shown in Fig. 2 of the drawings.

Pivotedly mounted on said transverse plate 86 carried by the tractor arms 22, is provided a fluid pressure cylinder 96, which is pivotally connected through its piston rod head to the side of one of the clam shell bucket segments and when fluid pressure is applied to one or the other ends of said fluid pressure cylinder, the clam shell bucket through said pressure, may be caused to rotate in an upward or downward direction according to which end of the fluid pressure cylinder the fluid pressure is applied, as shown in Fig. 9 of the drawings. By this movement of the clam shell bucket, through the action of the power means applied, it is possible to perform the operations of digging, ditching and back-hoeing as shown in Fig. 9.

Pressure cylinder 52, carried on the clam shell bucket segment provides power means for the opening and closing of said clam shell segments. When pressure is applied to the pressure cylinder in the position shown in Fig. 1 of the drawings the corner bars 34—34 and 36—36 will move upward by reason of the pivoted connection to head pin 40, and at the same time converge together as shown in Fig. 2 of the drawings, said upward and converging movement of the corner bars will cause the clam shell segments to move on their hinges 32 to an open position for dumping material or for other use.

In the hoe-backing operation, power means C may be applied to cause the clam shell segments to partly open and close in cooperation with the backward movement of the tractor, applying the use of the tractor dragging power. In the digging operation as shown in Fig. 8 of the drawings, the weight of the rear end of the tractor is applied to the clam shell segments through the action of power means A, in cooperation with power means B, carried on the boom arms, by this action the back segment of the clam shell bucket is forced into the ground, and with the action of power means C, the front segment of said clam shell bucket is forced in the ground and the clam shell bucket closed, enveloping the disturbed or broken dirt. Power means B and power means C may be used at the same time causing both segments of the clam shell to bite into the ground, and further pressure from power means C will close the clam shell segments completely.

In operations A, B, and C, in Fig. 9 of the drawings, a hinged lid denoted by 29' on the drawing may be used if desired to prevent the dirt from falling through the clam shell bucket.

From the foregoing description of my invention, it will be seen that I have provided an exceptionally simple form of clam shell digging machine, which operates from a central remote control station on a tractor or other suitable vehicle.

It is to be understood that the term "fluid pressure means" as used herein and in the claims represents a cylinder and a piston each of which is connected to one of a pair of members adapted to be operated by said means.

Changes in detail may be made without departing from the spirit or the scope of the invention, and the invention is therefore, not limited to the specific structures herein illustrated and described.

What I claim is:

1. Excavating means of the clam shell type comprising a vehicle, a pair of boom arms pivotally mounted on said vehicle, a clamshell bucket comprising a pair of cylindrical segments pivotally connected along the axis of the cylinder, one of said segments having its cylindrical side pivotally mounted on said boom arms substantially midway circumferentially of said cylindrical side, fluid pressure means comprising a pair of relatively movable members, one of which is pivoted to said arms and the other of which is pivoted on the pivotally mounted shell segment circumferentially offset around the periphery of the segment from the boom arm pivots, fluid pressure means for operating said boom arms comprising relatively movable members one of which is pivotally mounted on said vehicle and the other of which is pivotally mounted on said boom arms intermediate their ends.

2. The structure of claim 1 in which each bucket segment has a cutting edge and a remote marginal edge, an arm having a bell crank extension pivotally connected to one bucket segment at its remote marginal edge, an arm pivotally connected to the other bucket segment at its remote marginal edge, said arms being pivotally connected intermediate the ends of the first mentioned arm, fluid pressure means comprising a pair of relatively movable members one of which is pivotally connected to the bucket segment to which the second mentioned arm is connected, and the other of which is pivotally connected to said bell crank extension.

References Cited in the file of this patent

UNITED STATES PATENTS

| | | |
|---|---|---|
| 2,328,715 | Drott | Sept. 7, 1943 |
| 2,418,251 | Drott | Apr. 1, 1947 |
| 2,455,474 | Drott et al. | Dec. 7, 1948 |
| 2,605,563 | Browning | Aug. 5, 1952 |
| 2,676,052 | Mittry | Apr. 20, 1954 |